United States Patent [19]
Dam

[11] Patent Number: 5,455,887
[45] Date of Patent: Oct. 3, 1995

[54] COFFEE-MAKER

[75] Inventor: Nicolaas M. F. Dam, Hoogeveen, Netherlands

[73] Assignee: U.S. Philips Corporation, New York, N.Y.

[21] Appl. No.: 157,775

[22] Filed: Nov. 24, 1993

[30] Foreign Application Priority Data

Dec. 3, 1992 [EP] European Pat. Off. ............... 92203741

[51] Int. Cl.⁶ ............................... H05B 1/02; A47J 27/21
[52] U.S. Cl. .......................... 392/467; 392/465; 392/485; 219/492; 219/508; 219/491; 99/280; 99/328
[58] Field of Search ..................... 352/467, 465, 352/485–494; 99/280, 285, 328, 287, 289 R, 300, 295, 281; 219/508, 509, 483, 491, 494

[56] References Cited

U.S. PATENT DOCUMENTS

| | | | |
|---|---|---|---|
| 4,214,148 | 7/1980 | Fleischhauer | 219/308 |
| 4,486,648 | 12/1984 | Grasso | 219/501 |
| 4,544,830 | 10/1985 | Miller | 219/328 |
| 4,548,129 | 10/1985 | Van Der Sluys et al. | 99/281 |
| 4,550,652 | 11/1985 | Da Silva | 22/279 |
| 4,566,374 | 1/1986 | Medema et al. | 99/281 |
| 4,579,050 | 4/1986 | Niezen | 99/295 |
| 4,758,709 | 7/1988 | Schiebelhuth et al. | 219/283 |
| 4,886,955 | 12/1989 | Kimura | 219/494 |
| 4,944,217 | 7/1990 | Watanabe | 99/280 |
| 5,044,261 | 9/1991 | Kawazoe | 99/280 |
| 5,129,033 | 7/1992 | Ferrara et al. | 392/447 |
| 5,241,898 | 9/1993 | Newnan | 99/280 |
| 5,322,005 | 6/1994 | Enomoto | 99/282 |

FOREIGN PATENT DOCUMENTS

| | | | |
|---|---|---|---|
| 8701916 | 11/1987 | Germany | A47J 31/56 |
| 8101609 | 11/1982 | Netherlands | A47J 31/50 |
| 9119409 | 12/1991 | WIPO | H05B 1/02 |

Primary Examiner—Mark H. Paschall
Attorney, Agent, or Firm—Ernestine C. Bartlett

[57] ABSTRACT

A coffee-maker is provided which comprises a first supply voltage terminal (10) and a second supply voltage terminal (11), a heating element (12), a first switching element (13), and a second switching element (14), which heating element (12), first switching element (13) and second switching element (14) are serially coupled between the first supply voltage terminal (10) and the second supply voltage terminal (11), the first switching element (13) being adapted to set the heating element (12) to a first keep-warm temperature and the second switching element (14) being adapted to set the heating element (12) to a second keep-warm temperature. For an improved control to set the heating element (12) to the first and the second keep-warm temperature, the second switching element (14) is adapted to set the heating element (12) to the second keep-warm temperature depending upon a time needed to establish the first keep-warm temperature.

12 Claims, 1 Drawing Sheet

COFFEE-MAKER

FIELD OF THE INVENTION

The invention relates to a coffee-maker comprising a first supply voltage terminal and a second supply voltage terminal, a heating element, a first switching element, and a second switching element, which heating element, first switching element and second switching element are serially coupled between the first supply voltage terminal and the second supply voltage terminal, the first switching element being adapted to set the heating element to a first keep-warm temperature and the second switching element being adapted to set the heating element to a second keep-warm temperature. A keep-warm temperature is to be understood to mean an average temperature, which temperature is generated for keeping warm a coffee-pot with coffee by means of hotplate which forms part of the coffee-maker and which is coupled to the heating element.

Such a coffee-maker can be used for making coffee and keeping it warm in a domestic or a professional environment.

BACKGROUND OF THE INVENTION

Such a coffee-maker is known inter alia from the German Utility Model bearing the publication number 87 01 916. To select the first or the second keep-warm temperature the prior-art coffee-maker comprises a push-button switch having a first and a second position. Depending on the user's choice the prior-art coffee-maker generates the first or the second keep-warm temperature, the first and the second switching element being constructed as a first and second thermostat, and the first keep-warm temperature being higher than the second keep-warm temperature. In the first position, which corresponds to the first keep-warm temperature, the first thermostat controls the heating element and the second thermostat is shorted out by means of the push-button switch. In the second position, which corresponds to the second keep-warm temperature, the first thermostat is in an on-state and the second thermostat controls the heating element.

A disadvantage of such a coffee-maker is that the position of the push-button switch dictates not only the keep-warm temperature but also the brewing temperature. The brewing temperature is to be understood to mean an average temperature, which temperature is generated by means of the heating element for the purpose of making coffee. Since the position of the push-button switch dictates the brewing temperature the prior-art coffee-maker will make coffee at an unsuitable brewing temperature if the user inadvertently fails to adjust the push-button switch prior to brewing coffee.

SUMMARY OF THE INVENTION

It is an object of the invention to provide a coffee-maker having an improved control means for setting the heating element to the first and the second keep-warm temperature.

A coffee-maker in accordance with the invention is characterized in that the second switching element is adapted to set the heating element to the second keep-warm temperature depending upon a time required to establish the first keep-warm temperature. The invention is based on the recognition of the fact that the control means for the respective keep-warm temperatures unnecessarily dictates the brewing temperature. Since in the coffee-maker in accordance with the invention the second keep-warm temperature is set depending on the time required to establish the first keep-warm temperature the first keep-warm temperature must be established before the second keep-warm temperature can be set by the coffee-maker. As a result, the first keep-warm temperature will function as the brewing temperature, after which depending on a choice made by a user the second keep-warm temperature can be used for keeping warm a coffeepot with coffee.

A further embodiment of a coffee-maker in accordance with the invention is characterized in that the first switching element comprises a thermostat with a first switch and a temperature sensor, the first switch being coupled in series with the heating element and the second switching element between the first supply voltage terminal and the second supply voltage terminal. When the first switch is implemented by means of a thermostat the first switch will be in an on-state during a heating interval until the temperature sensor detects that a first temperature threshold is exceeded, and the first switch will be in an off-state during a cooling interval until a second temperature threshold is reached. In the coffee-maker in accordance with the invention, in which the coffee-maker sets the second keep-warm temperature in dependence upon the time required for reaching the first keep-warm temperature, the heating interval or the cooling interval can be used as the time measure. In order to obtain the second keep-warm temperature, which is lower than the first keep-warm temperature, the second switching element is in an on-state for a shorter time interval than the first switching element (the first switch), or the second switching element is in an off-state for a longer time interval than the first switching element (the first switch).

A further embodiment of a coffee-maker in accordance with the invention is characterized in that the second switching element comprises a second switch and a signal sensor, the second switch being coupled in series with the heating element and the first switching element between the first supply voltage terminal and the second supply voltage terminal, and the signal sensor being adapted to control the second switch. Similarly to the first switch the second switch causes an interruption of the current providing the second keep-warm temperature by means of the heating element. By means of the signal sensor the time required to establish the first keep-warm temperature is detected and the second switch is controlled on the basis of the time measure.

A further embodiment of a coffee-maker in accordance with the invention is characterized in that the signal sensor comprises a resistor and a microprocessor, the resistor being coupled in series with the heating element, the first switching element and the second switch between the first supply voltage terminal and the second supply voltage terminal, and the microprocessor being adapted to control the second switch in dependence upon a voltage across the resistor. The present embodiment is a simple implementation of the signal sensor. During the on-state of the first (and the second) switch the current generates a voltage across the resistor. When the time interval during which the voltage is present or absent is detected by the microprocessor this will yield the time required to establish the first keep-warm temperature. For the purpose of detection the microprocessor may comprise a comparator circuit, a memory circuit and a clock circuit.

BRIEF DESCRIPTION OF THE DRAWINGS

The above and other (more detailed) aspects of the invention will now be described and elucidated more elaborately with reference to the accompanying drawing, in which.

In these Figures like parts bear the same reference numerals.

DETAILED DESCRIPTION OF THE PREFERRED EMBODIMENTS

Figure 1:
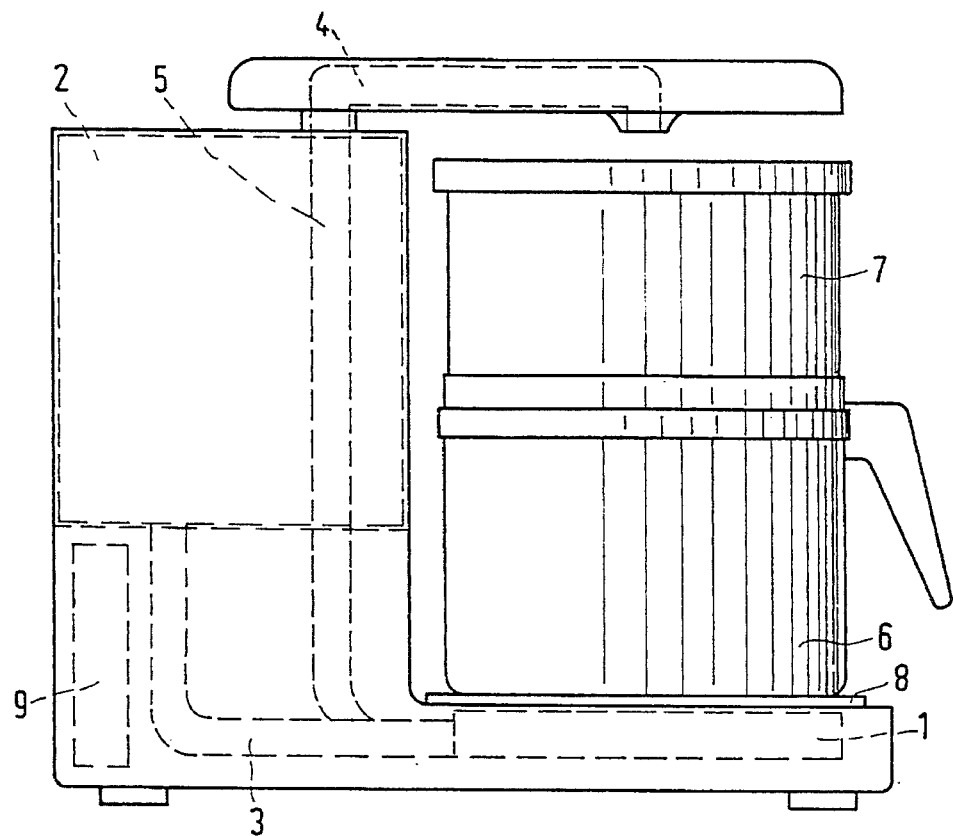
FIG. 1 shows a possible embodiment of a coffee-maker in accordance with the invention.

FIG. 1 shows an embodiment of a coffee-maker in accordance with the invention. The embodiment comprises a thermally conducting water-supply casting (or tubular pump) 1, which casting is connected to a water reservoir 2 for the supply of cold water by means of a water supply tube 3 and to a water outlet tube 4 for discharging hot water by means of a water discharge tube 5. To complete the coffee-maker the embodiment comprises a coffee-pot 6, which coffee-pot can be placed on a hotplate 8 and underneath a filter device 7. To heat the thermally conductive water-supply casting 1 and the hotplate 8 the embodiment comprises a circuit 9 adapted to set a heating element (12) to a first or to a second keep-warm temperature. In the present embodiment the heating element (12) is not arranged in a module comprising the electrical circuit 9 but the heating element (12) is arranged near the thermally conductive water-supply casting 1 and the hotplate 8.

Figure 2:
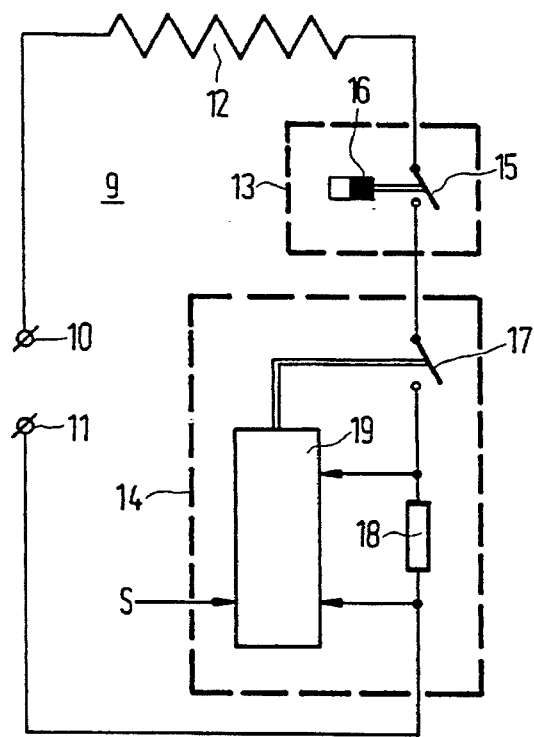
FIG. 2 shows an electrical circuit for a coffee-maker in accordance with the invention.

FIG. 2 shows an electrical circuit for a coffee-maker in accordance with the invention. The relevant circuit comprises a first supply voltage terminal 10 and a second supply voltage terminal 11, a heating element 12, which heating element is (thermally) coupled to the thermally conductive water-supply casting (1) and the hotplate (8), a first switching element 13, which first switching element comprises a thermostat with a first switch 15 and a temperature sensor 16, and a second switching element 14, which second switching element comprises a second switch 17 and a signal sensor with a resistor 18 and a microprocessor 19. The heating element 12, the switch 15, the switch 17 and the resistor 18 are serially coupled between the supply voltage terminals 10 and 11, the switch 15 being controlled by the temperature sensor 16 and the switch 17 being controlled by the microprocessor 19. To control the switch 17 the microprocessor 19 is coupled across the resistor 18 and the microprocessor 19 receives a control signal S, which control signal is related to a choice made by a user between the first or the second keep-warm temperature. The microprocessor is powered with a (mains) supply voltage applied to the supply voltage terminals 10 and 11 via a power supply circuit, not shown. To explain the operation of the circuit a distinction is made between a brew mode and a keep-warm mode of the coffee-maker. When the (mains) supply voltage is applied to the supply voltage terminals 10 and 11 by means of a main switch, not shown, the coffee-maker is set to the brew mode and the switching elements 13 and 14 are in an on-state. As a result of the (mains) supply voltage and the on-state an electric current is obtained through the heating element 12, by means of which current the heating element 12 heats the thermally conductive water-supply casting (1). When the water reservoir (2) contains (cold) water the brew mode is maintained. The water in the thermally conductive water-supply casting (1) is heated and the water is pumped from the water reservoir (2) to the water outlet tube (4). After the water reservoir has been drained the keep-warm temperature of the thermally conductive water-supply casting (1) rises to a first temperature threshold, which is detected by the switching element 13 (i.e. the temperature sensor 16). As a result, the switching element 13 (i.e. the switch 15) is turned off and the electric current through the heating element 12 is interrupted, which is detected by the switching element 14 (i.e. the signal sensor comprising the resistor 18 and the microprocessor 19). After the thermally conductive water-supply casting (1) has cooled down to a second temperature threshold the switching element 13 (i.e. the switch 15) resumes the on-state and the coffee-maker is set from the brew mode to the keep-warm mode (after a predetermined time interval). Depending upon a choice made by a user of the coffee-maker, which choice is signalled to the switching element 14 (i.e. the microprocessor 19) by means of the control signal S, the coffee-maker generates the first or the second keep-warm temperature. If the first keep-warm temperature has been chosen the heating element 12 is controlled by means of the switching element 13, the switching element 13 (i.e. the switch 15) being turned on until the first temperature threshold is reached and after the second temperature threshold is reached. This operation of the switching element 13 corresponds to the operation in the brew mode. If the second keep-warm temperature has been chosen the heating element 12 is controlled by means of the switching element 14. For the generation of the second keep-warm temperature the switching element 14 is adapted to detect a time interval required to establish the first keep-warm temperature. The time interval determined by the switching element 13 is a time interval situated between an instant at which a first temperature threshold defined by the first switching element 13 is exceeded and an instant at which a second temperature threshold defined by the switching element 13 is exceeded (cooling interval), or between an instant at which a second temperature threshold is exceeded and an instant at which a first temperature threshold is exceeded (heating interval). The time interval can be detected at the end of the brew mode or at the beginning of the keep-warm mode. In the circuit shown in FIG. 2 the time interval is detected by means of the (electric) current through the resistor 18. The resistor 18 converts the relevant current into a voltage, on the basis of which voltage the microprocessor 19 detects the time interval. The electric current by means of which the heating element 12 heats the hotplate (8) is passed through the switching element 14 during a fraction of the time interval in order to generate the second keep-warm temperature.

A distinct advantage of the coffee-maker in accordance with the invention is that coffee-making is always effected in the brew mode at the first keep-warm temperature, which keep-warm temperature is suitable for making coffee. Another advantage of the coffee-maker in accordance with the invention is that for generating the first and the second keep-warm temperature the coffee-maker produces only a limited mains pollution because the (mains) supply voltage is switched at a low frequency (i.e. after a number of mains voltage cycles).

The invention is not limited to the embodiments shown in the Figures. Within the scope of the invention several modifications will be conceivable to those skilled in the art. One possible modification concerns the heating element, which heating element need not be (thermally) coupled to both the thermally conductive water-supply casting and the hotplate. Another modification concerns the first and the second switching element, which switching elements can be implemented in several manners. A further modification concerns the first and the second switch, which switches may be constructed by means of a single switch, which single switch is controlled by the temperature sensor and the signal sensor, while the first keep-warm temperature may be lower or higher than the second keep-warm temperature. Another modification involves the microprocessor, which microprocessor may be adapted to realize a further control function in the coffee-maker. An example of a further control function is the detection of an uncommon temperature variation. An uncommon temperature variation occurs, for example, when water is supplied to the water reservoir during the keep-warm mode. As a result of the supply of water the microprocessor may terminate the keep-warm mode and return to the brew mode.

I claim:

1. A coffee-maker having a BREW state in which a temperature is generated by a heating unit for the purpose of making coffee, a first KEEP-WARM state and a second KEEP-WARM state in which a temperature is set to keep brewed coffee warm, said coffee-maker comprising a first supply voltage terminal(10) and a second supply voltage terminal (11), a heating element (12), a first switching element (13), and a second switching element (14), which heating element (12), first switching element (13) and second switching element (14) are serially coupled between the first supply voltage terminal (10) and the second supply voltage terminal (11), the first switching element (13) being associatively adapted to set the heating element (12) to a first KEEP-WARM temperature to establish the first KEEP-WARM state and the second switching element (14) being associatively adapted to set the heating element (12) to a second KEEP-WARM temperature to establish a second KEEP-WARM state wherein the heating element (12) functions responsive to the first switching element (13) to establish the first KEEP-WARM temperature within a first period of time, T1, and the second switching element (14) is associatively adapted to set the heating element (12) to the second KEEP-WARM temperature after T1 has elapsed and the first KEEP-WARM temperature is established.

2. A coffee-maker as claimed in claim 1, characterized in that the first switching element (13) comprises a thermostat with a first switch (15) and a temperature sensor (16), the first switch (15) being coupled in series with the heating element (12) and the second switching element (14) between the first supply voltage terminal (10) and the second supply voltage terminal (11).

3. A coffee-maker as claimed in claim 1, characterized in that the second switching element (14) comprises a second switch (17) and a signal sensor (18, 19), the second switch (17) being coupled in series with the heating element (12) and the first switching element (13) between the first supply voltage terminal (10) and the second supply voltage terminal (11), and the signal sensor (18, 19) being associatively adapted to control the second switch (17).

4. A coffee-maker as claimed in claim 3, characterized in that the signal sensor (18, 19) comprises a resistor (18) and a microprocessor (19), the resistor (18) being coupled in series with the heating element (12), the first switching element (13) and the second switch (17) between the first supply voltage terminal (10) and the second supply voltage terminal (11), and the microprocessor (19) being associatively adapted to control the second switch (17) in dependence upon a voltage across the resistor.

5. A coffee-maker as claimed in claim 2, wherein the second switching element (14) comprises a second switch (17) and a signal sensor (18, 19), the second switch (17) being coupled in series with the heating element (12) and the first switching element (13) between the first supply voltage terminal (10) and the second supply voltage terminal (11), and the signal sensor (18, 19) being associatively adapted to control the second switch (17).

6. A coffee-make as claimed in claim 5, wherein the signal sensor (18, 19) comprises a resistor (18) and a microprocessor (19), the resistor (18) being coupled in series with the heating element (12), the first switching element (13) and the second switch (17) between the first supply voltage terminal (10) and the second supply voltage terminal (11), and the microprocessor (19) being associatively adapted to control the second switch (17) in dependence upon a voltage across the resistor.

7. A coffee-maker as claimed in claim 1 wherein the BREW temperature and the first KEEP-WARM temperature are the same.

8. A coffee-maker as claimed in claim 1 wherein the second KEEP-WARM temperature is lower than the first KEEP-WARM temperature.

9. A coffee-maker as claimed in claim 7 wherein the second KEEP-WARM temperature is lower than the first KEEP-WARM temperature.

10. A coffee-maker as claimed in claim 2 wherein the first switch (15) is in an on-state during a heating interval until the temperature sensor detects that a first temperature threshold is exceeded, and the first switch (15) is in an off-state during a cooling interval until a second temperature threshold is reached.

11. A coffee-maker as claimed in claim 3 wherein T1 corresponds to the heating interval.

12. A coffee-maker as claimed in claim 3 wherein T1 corresponds to the cooling interval.

* * * * *